(12) United States Patent
Lambert et al.

(10) Patent No.: US 11,809,352 B2
(45) Date of Patent: Nov. 7, 2023

(54) FLEXIBLE, HIGH-BANDWIDTH LINK MANAGEMENT BETWEEN SYSTEM AND SUBSYSTEM BASEBOARD MANAGEMENT CONTROLLERS

(71) Applicant: Dell Products L.P., Round Rock, TX (US)

(72) Inventors: Timothy M. Lambert, Austin, TX (US); Bhavesh A. Patel, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/470,077

(22) Filed: Sep. 9, 2021

(65) Prior Publication Data
US 2023/0074345 A1   Mar. 9, 2023

(51) Int. Cl.
| | | |
|---|---|---|
| *G06F 13/36* | (2006.01) | |
| *G06F 8/65* | (2018.01) | |
| *G06F 9/445* | (2018.01) | |
| *G06F 13/10* | (2006.01) | |

(52) U.S. Cl.
CPC ............ *G06F 13/36* (2013.01); *G06F 8/65* (2013.01); *G06F 9/44505* (2013.01); *G06F 13/102* (2013.01)

(58) Field of Classification Search
CPC ........ G06F 13/36; G06F 8/65; G06F 9/44505; G06F 13/102
See application file for complete search history.

(56) References Cited

U.S. PATENT DOCUMENTS

| | | | |
|---|---|---|---|
| 6,675,253 B1 * | 1/2004 | Brinkmann, Jr. ... | G06F 13/4022 710/316 |
| 7,658,625 B2 * | 2/2010 | Jubelirer .............. | H01R 31/065 439/954 |
| 7,848,232 B2 | 12/2010 | Loffink et al. | |
| 10,728,086 B2 * | 7/2020 | Rao ..................... | H04L 41/0663 |
| 2006/0073717 A1 * | 4/2006 | Ng .......................... | H01R 35/04 439/131 |
| 2006/0280195 A1 | 12/2006 | Lopez, Jr. et al. | |
| 2008/0043769 A1 * | 2/2008 | Hirai ....................... | H04L 45/00 370/420 |
| 2008/0256526 A1 * | 10/2008 | Ellsworth ........... | G06F 11/1433 717/168 |
| 2009/0157865 A1 | 6/2009 | Winter | |
| 2013/0010654 A1 * | 1/2013 | Kushnir .................. | H01P 1/213 455/73 |
| 2013/0179872 A1 * | 7/2013 | Kuzmack ................. | G06F 8/65 717/173 |
| 2014/0235079 A1 * | 8/2014 | Wallace ................. | H01R 35/04 439/131 |

(Continued)

*Primary Examiner* — Farley Abad
*Assistant Examiner* — Henry W Yu
(74) *Attorney, Agent, or Firm* — Larson Newman, LLP

(57) ABSTRACT

An information handling system includes a secondary baseboard management controller that may transmit a first set of data via an external interface, and transmit a second set of data via an internal interface. A primary baseboard management controller includes a data traffic manager that may transmit a first signal for the current data to be transmitted if the current data is of the first set of data, or transmit a second signal if the current data is of the second set of data.

20 Claims, 12 Drawing Sheets

(56) References Cited

U.S. PATENT DOCUMENTS

| | | | |
|---|---|---|---|
| 2016/0072642 A1* | 3/2016 | Shih | H04L 12/4666 |
| | | | 370/392 |
| 2017/0083239 A1* | 3/2017 | Heinrichs | G06F 9/44505 |
| 2020/0057741 A1* | 2/2020 | Zhang | G06F 13/4022 |
| 2020/0257518 A1* | 8/2020 | Liedtke | G06F 8/65 |
| 2020/0285750 A1* | 9/2020 | Jaeger | G06F 21/30 |

* cited by examiner

FLEXIBLE, HIGH-BANDWIDTH LINK MANAGEMENT BETWEEN SYSTEM AND SUBSYSTEM BASEBOARD MANAGEMENT CONTROLLERS

FIELD OF THE DISCLOSURE

The present disclosure generally relates to information handling systems, and more particularly relates to flexible, high-bandwidth link management between system and subsystem baseboard management controllers.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a secondary baseboard management controller that may transmit a first set of data via an external interface, and transmit a second set of data via an internal interface. A primary baseboard management controller includes a data traffic manager that may transmit a first signal for the current data to be transmitted if the current data is of the first set of data, or transmit a second signal if the current data is of the second set of data.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1A:
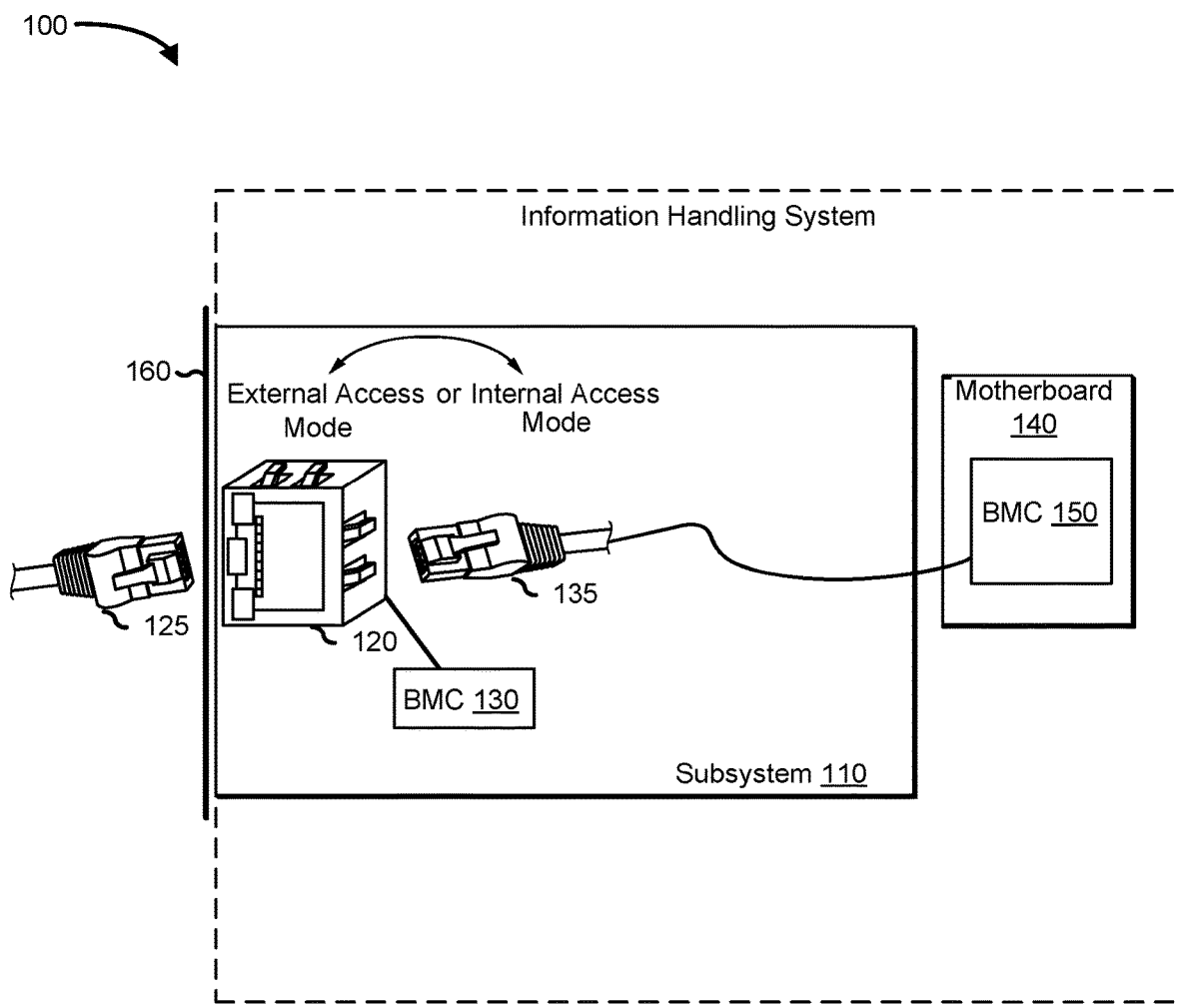
FIG. 1A, FIG. 1B, and FIG. 1C are block diagrams illustrating a system for flexible, high-bandwidth link management between system and subsystem baseboard management controllers (BMCs), according to an embodiment of the present disclosure.
Figure 7:
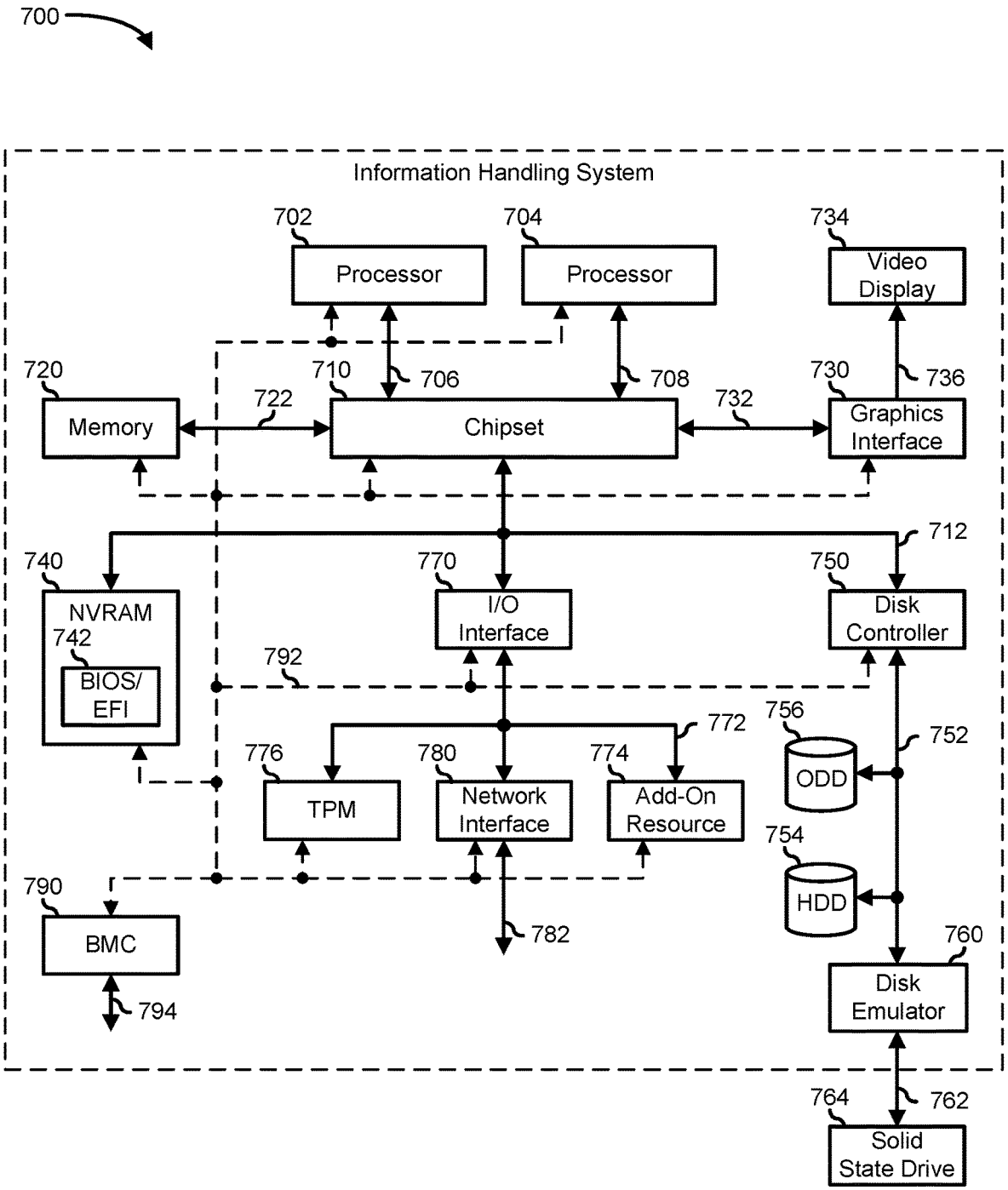
FIG. 7 is a block diagram illustrating an information handling system according to an embodiment of the present disclosure.

FIG. 1A shows an information handling system 100 configured with flexible, high-bandwidth link management between system and add-in subsystem BMCs. In particular, information handling system 100, which is similar to information handling system 700 of FIG. 7, is configured with an interface, such as a port, having one media access control (MAC) address and two orientations including an external access mode and an internal access mode. Information handling system 100 includes a subsystem 110 and a motherboard 140 with a BMC 150. Subsystem 110 includes a port 120, a BMC 130, and a faceplate 160. The components of information handling system 100 may be implemented in hardware, software, firmware, or any combination thereof. The components shown are not drawn to scale and information handling system 100 may include additional or fewer components. In addition, connections between components may be omitted for descriptive clarity.

Motherboard 140 is the main printed circuit board (PCB) in information handling system 100. The motherboard holds and allows communication between components of the information handling system such as a central processing unit (CPU), memory, BMC 150, etc. BMC 150, which is similar to BMC 790 of FIG. 7, may include any system, device, or apparatus configured to facilitate management and/or control of information handling system 100 and/or one or more of its components. BMC 150 is also referred herein as a base, system, or primary BMC. BMC 150 may be configured to issue a command and/or a signal to manage and/or control information handling system 100 and/or its components. BMC 130, which is similar to BMC 150, may transmit the data traffic based on the command and/or the signal received from BMC 150. BMC 130 is also referred to herein as a subsystem or secondary BMC. BMC 150 may include a microprocessor, microcontroller, digital signal processor (DSP), application-specific integrated circuit (ASIC), field-programmable gate array (FPGA), electrically erasable programmable read-only memory (EEPROM), or any combination thereof. BMC 150 may also be configured to provide out-of-band management facilities for the management of information handling system 100. Such management may be made by BMC 150 even if information handling system 100 is powered off or powered to a standby state.

Subsystem 110 may be one of a variety of accelerators, add-in cards, or trays. An accelerator includes a hardware device or software program used to enhance a function or performance of the CPU of an information handling system. Hardware devices include trays or add-in cards that can be plugged the information handling system such as in a PCB. Examples of accelerators include a hardware accelerator, a graphics accelerator, a cryptographic accelerator, etc. The hardware accelerator is used to enhance speed and performance while the graphics accelerator, such as graphics processing unit (GPU) tray is used to enhance graphics processing while the cryptographic accelerator is used to enhance encryption and decryption functionality of a computer. Examples of an add-in card include a smart network interface card (NIC), an FPGA add-in card, an ASIC add-in card, etc.

Typically, these subsystems include an onboard or integrated BMC, such as BMC 130, which can communicate with other BMCs. For example, BMC 130 can communicate with BMC 150 via a link. BMC 130 is configured to manage and/or monitor subsystem 110 in this example. BMC 130 allows a user to have the same or similar management capabilities to manage subsystem 110 that BMC 150 typically performs for information handling system 100. The communication between the secondary BMC and the primary BMC may use one or more interfaces such as an Inter-Integrated Circuit (I²C) interface, a Universal Serial Bus (USB), a Peripheral Component Interconnect-Express (PCIe) interface, a registered jack 45 (RJ45) interface, etc. These interfaces could be used for various functions such as telemetry, firmware updates, attestations, etc.

However, there are certain limitations to using these interfaces. For example, because primary BMCs typically do not have a PCIe port, a PCIe interface between a secondary BMC and a primary BMC cannot be implemented. Similarly, a USB host controller is typically not available on a primary BMC while the I²C interface is typically from a bandwidth perspective for data-intensive use cases such as a firmware update. Because RJ45 connectors are typically inserted into a port from outside the chassis of the information handling system, there are security concerns to its usage. In addition, a user may want to control the flow of information associated with the subsystem outside of the chassis.

To address these and other concerns, the present disclosure includes a system and method for flexible, high-bandwidth link management between system and subsystem BMCs. In particular, the present disclosure includes management of wired communication link between a primary BMC and a secondary BMC, by controlling access to a communication, data or network interface. Here, external and/or internal access to the interface is controlled via electrical, programmatic, electrical, electronic, mechanical, or manual means. For example, in one embodiment, a user can direct secure information to an internal communication channel and use an external communication channel for telemetry data via programmatic, electrical, and/or electronic means. In another embodiment, utilization of the internal communication channel versus the external communication channel may be pre-determined during the production of the information handling system. In yet another embodiment, a mechanical rotation guide allows the user to control access to the external or internal Ethernet port.

Subsystem 110 is connected to motherboard 140 via a flexible high-bandwidth intra-BMC link that allows data-intensive communication. The data-intensive communication can be handled by a wired connection such as the Ethernet™ cable, category 5 (CAT5) cable, 10BASE-T, 100BASE-TX, 1000BASE-T, and the like. The aforementioned typically uses one or more network or communication interfaces that can be coupled to allow point-to-point communication between BMCs or service processors. In one example, the communication interface can include a link interface such as an RJ45 or a PHY chip. The PHY chip can include hardware and firmware used to provide communication channels and in one form include a receiver and transmitter circuit operable to be used to establish high-speed serial communication such as a gigabyte or higher. The link interface can include one or more ports that may be rotatable between internal and external access, such as port 120. The link interface may be configurable for management network connections internal and/or external to the chassis of the information handling system. An internal interface allows for a faster and secure firmware update to the subsystem and/or add-in card components associated with the secondary BMC such as BMC 130. An external interface allows for a low latency path for telemetry data between the primary and secondary BMC.

Connectors, such as a connector 125 and a connector 135, may be plugged into port 120 to facilitate the connection between BMC 130 and BMC 150. The connector may be a small form-factor pluggable (SPF) connector or enhanced SFP (SFP+), RJ45 connectors, and/or a variety of other connectors known in the art. The port may be an SFP or SFP+ port, a female RJ45 port, and/or a variety of other female ports known in the art. When port 120 is configured for external access mode, connector 125 may access port 120 through faceplate 160 which may be flushed with the external chassis of information handling system 100. When port 120 is configured to an internal access mode, connector 135 may access port 120 inside the chassis of information handling system 100. Each connector 125 and connector 135 is associated with a cable, such as a category 5 (CAT5) cable or similar that is connected to BMC 150 which allows BMC 130 and BMC 150 to be communicatively coupled with an interface.

Port 120 may be a data port, a network port, an Ethernet port or similar which is depicted herein as an RJ45 to connect BMC 130 and BMC 150. Port 120 may be connected to BMC 130 via a media-independent interface such as a reduced gigabit media-independent interface (RGMII) serial gigabit media-independent interface (SGMII), high serial gigabit media-independent interface (HSGMII), or similar. Port 120 may be connected to BMC 150 via a cable such as an Ethernet cable, CAT5 cable or similar. Port 120 may include other suitable devices, such as other present and future networking standards and interfaces, such as fiber optic devices, for example. Here, port 120 has two access modes, an external access mode, and an internal access mode. If configured for external access mode, then port 120 is accessible through the faceplate of the chassis of information handling system 100. If configured for internal access mode, then port 120 is accessible inside the chassis by a cable while the faceplate is blocked such as by the body of a rotated structure in port 120. In another example, the hole to access port 120 via the faceplate is covered.

Figure 1B:
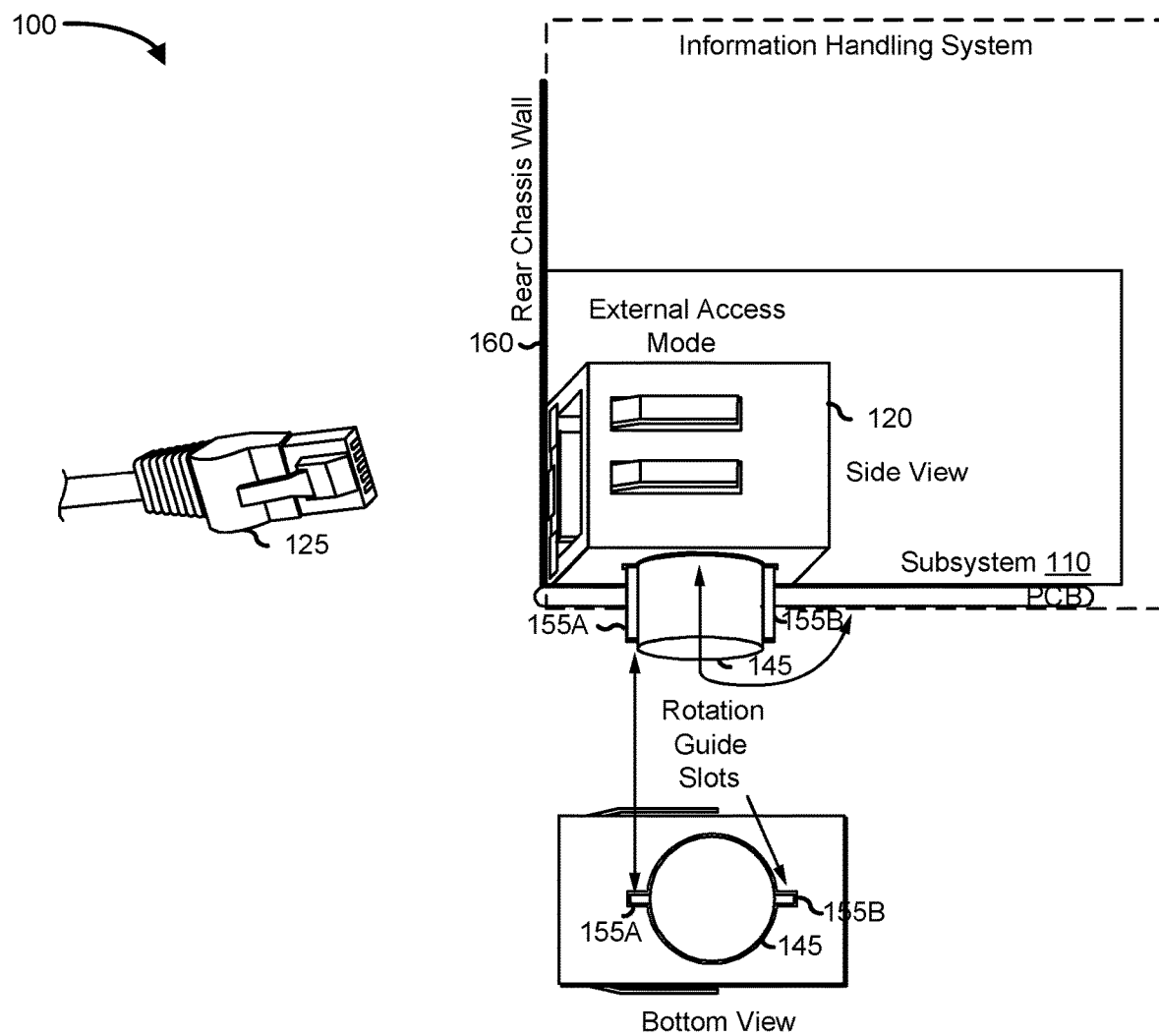

FIG. 1B shows a side view of the subsystem 110 having a rotating structure for changing the access mode of port 120. Port 120 can include a rotating structure 145 that can be physically rotated from ninety to one hundred and eighty degrees horizontally and/or vertically. The rotating structure can be physically rotated by a user when the add-in smart card or the accelerator tray is outside of the chassis of the information handling system, as chassis intrusion or other tamper detection and prevention methods can prevent the user from physically rotating the rotating guide. Rotating structure 145 is shown pushed-out of port 120, wherein port 120 is in an external access mode. The external access mode is wherein a data connector can be plugged into the data port from outside the chassis of information handling system 105. Rotating structure 145 includes rotation guide slots 155A and 155B which guides the rotation of the rotating structure to allow the port for internal or external access.

View 175 shows a bottom view of rotating structure 145. Rotating structure 145 may be rotated according to the direction of the arrow. For example, to change the access mode, the rotating structure may be lifted, rotated ninety or one hundred eighty degrees, and released into a guide. A lock may be in place to prevent rotating the rotating structure greater than one hundred eighty degrees. When the rotating structure is rotated in a particular direction, the external access to port 120 via faceplate 190 may be blocked.

Figure 1C:
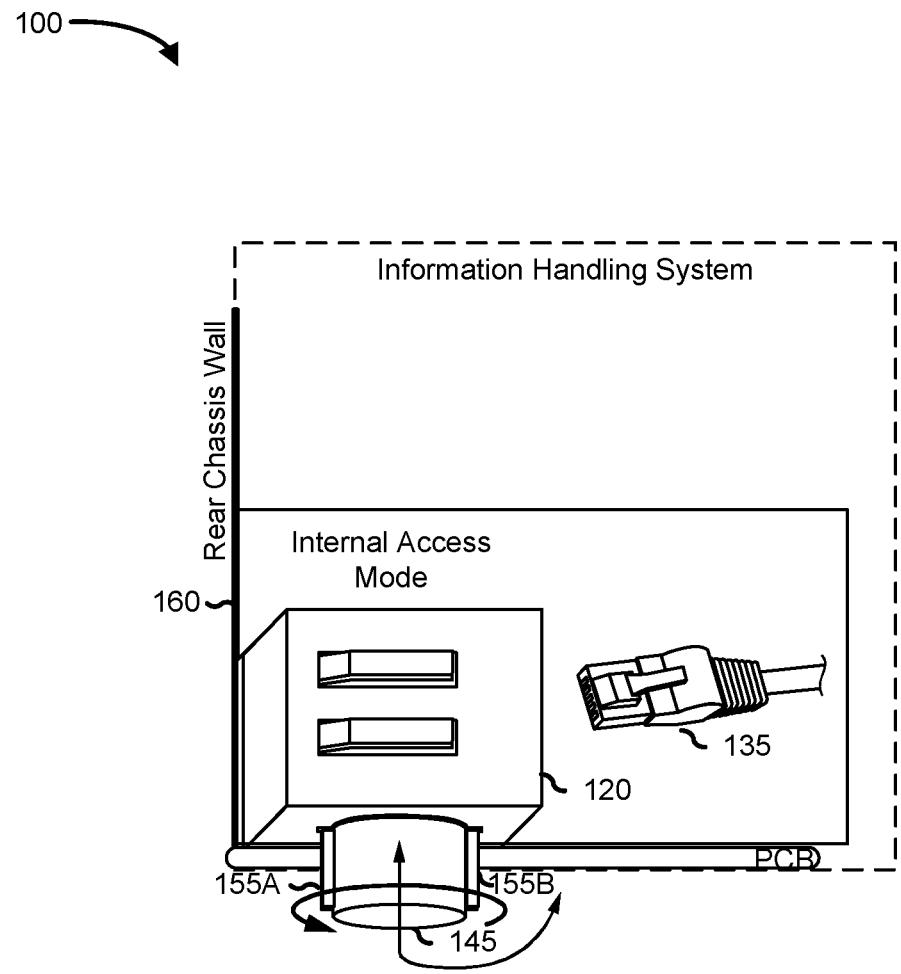

FIG. 1C shows a side of subsystem 110 having the rotating structure for changing the access mode of port 120. Here, rotating structure 145 is shown pushed-out of port 120, wherein port 120 is in the internal access mode. The internal access mode is wherein the data connector can be plugged into the port from inside the chassis of information handling system 105. A cable may be soldered in a PCB and its connector 135 plugged in port 120. During the internal access mode, access to the port 120 via the faceplate 160 is blocked. Rotating structure 145 may be rotated into a particular direction, such that the mode of port 120 may be switched from internal access mode to external access mode, such that access to port 120 through faceplate 160 is unblocked.

Those of ordinary skill in the art will appreciate that the configuration, hardware, and/or software components of information handling system 100 depicted in FIG. 1 may vary. For example, the illustrative components within information handling system 100 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 2A:
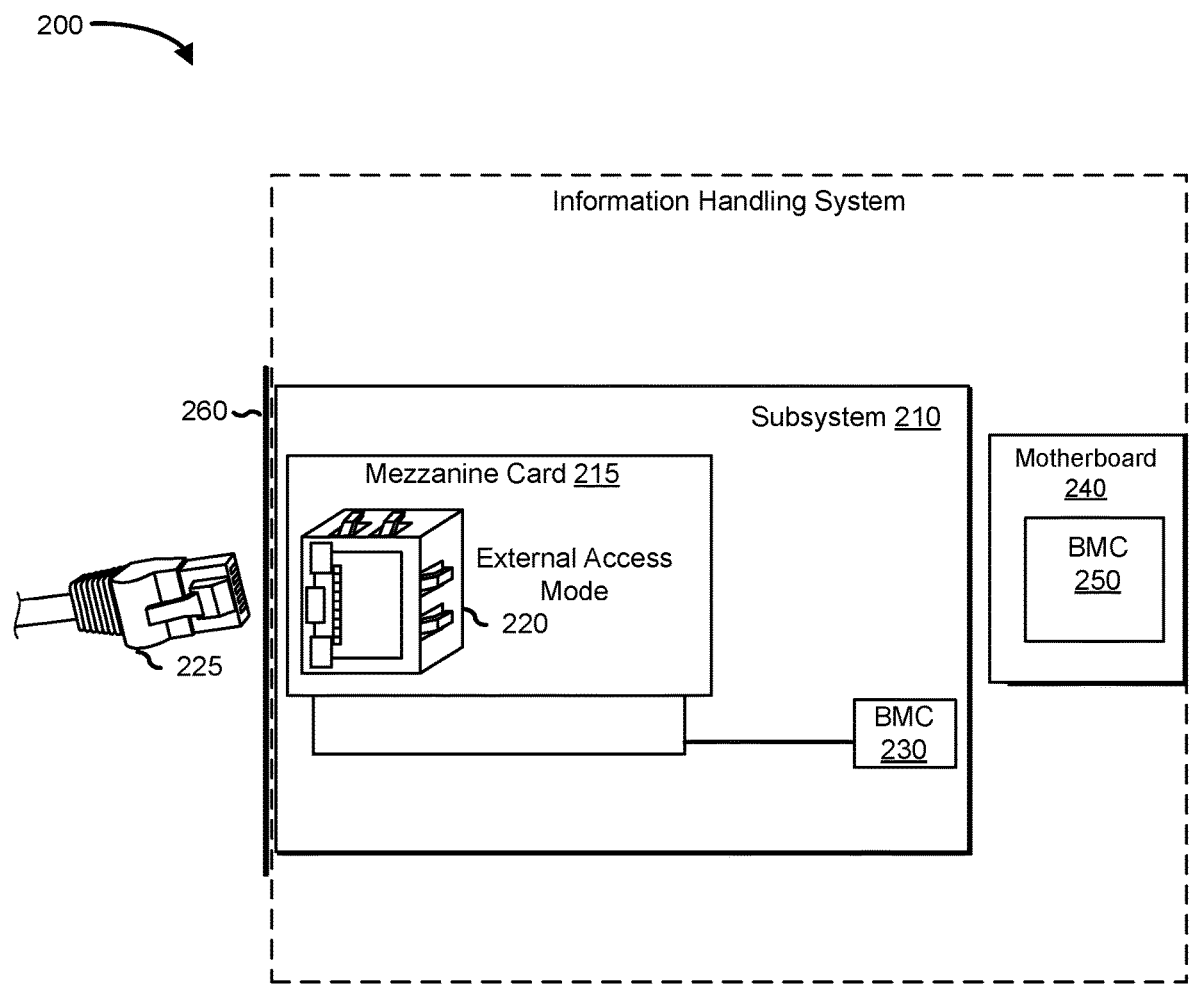
FIG. 2A and FIG. 2B are block diagrams illustrating a system for flexible, high-bandwidth link management between system and subsystem BMCs, according to an embodiment of the present disclosure.

FIG. 2A shows an information handling system with flexible, high-bandwidth link management between the system and subsystem BMCs. Information handling system 200 which is similar to information handling system 100 of FIG. 1 may be configured having one MAC and one interface having a static orientation. The orientation of the interface may be determined during manufacture. Information handling system 200 includes a subsystem 210 and a motherboard 240 with a BMC 250. Subsystem 210 includes a BMC 230, a faceplate 260, and a mezzanine card 215. The components of information handling system 200 may be implemented in hardware, software, firmware, or any combination thereof. The components shown are not drawn to scale and information handling system 200 may include additional or fewer components. In addition, connections between components may be omitted for descriptive clarity.

Figure 2B:
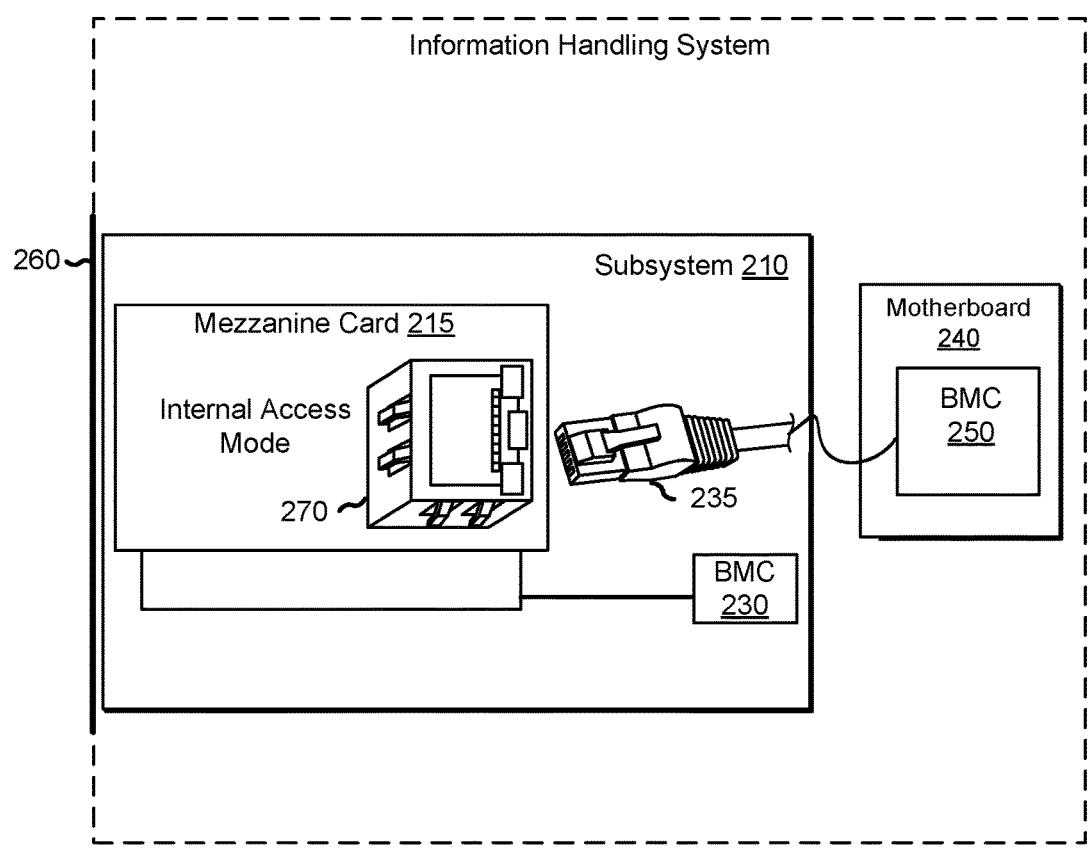

Mezzanine card 215 is a PCB that plugs into subsystem 210 which may be an accelerator tray or an add-in card. Mezzanine card 215 also referred to as a daughter card, maybe a peripheral component interconnect mezzanine card (PMC), an IndustryPack (IP), etc. Mezzanine card 215 may provide additional functionalities by providing a means to connect other peripheral devices. Mezzanine card 215 may include a port configured for external access mode or internal access mode. Here, FIG. 2A shows mezzanine card 215 that includes port 220, which is similar to port 120 of FIG. 1, configured for external access. FIG. 2B shows information handling system 200 that includes mezzanine card 215 with a port 270 that is configured for internal access, wherein a data connector connected to BMC 150 can be plugged into port 270 inside chassis of the information handling system.

Figure 3A:
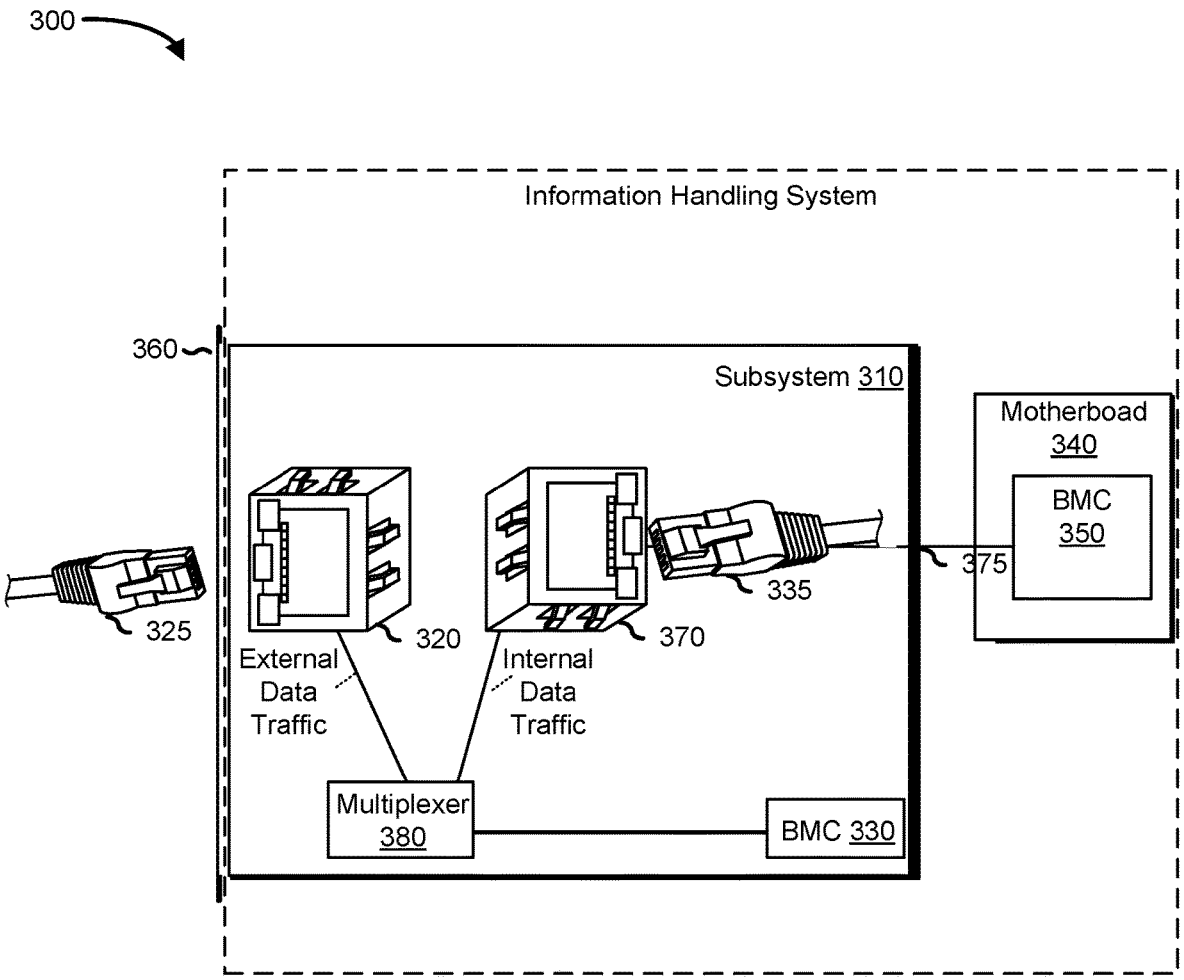
FIG. 3A and FIG. 3B are block diagrams illustrating a system for flexible, high-bandwidth link management between system and subsystem BMCs, according to an embodiment of the present disclosure.
Figure 3B:
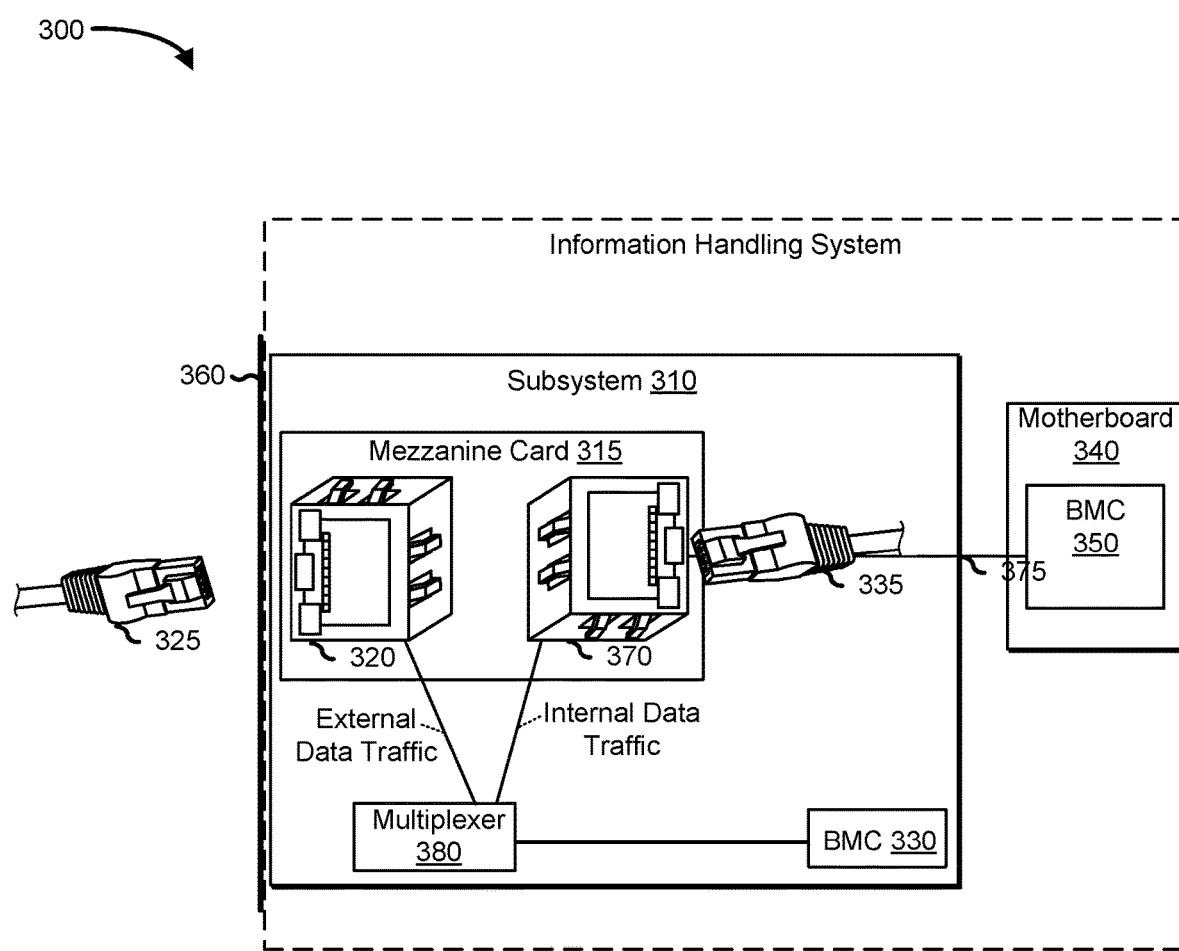

FIG. 3A and FIG. 3B show an information handling system 300 with flexible, high-bandwidth link management between system and subsystem BMCs. Information handling system 300 which is similar to information handling system 200 of FIG. 2 is configured having one MAC and two interfaces or ports, wherein each interface has a static orientation, such that the high-bandwidth link between the BMCs is multiplexed between internal and external access modes. The orientation of the interface may be determined during manufacture. Information handling system 300 is similar to information handling system 200 of FIG. 2 and includes a subsystem 310 and a motherboard 340 with a BMC 350. Subsystem 310 includes a port 320, a port 370, a multiplexer 380, and a BMC 330. FIG. 3B shows an information handling system 300, wherein subsystem 310 includes a mezzanine card which includes port 320 and port 370 instead of the ports being directly disposed on subsystem 310 as in FIG. 3A. The components of information handling system 100 may be implemented in hardware, software, firmware, or any combination thereof. The components shown are not drawn to scale and information handling system 100 may include additional or fewer components. In addition, connections between components may be omitted for descriptive clarity.

Port 320 is configured to be externally accessible by a connector 325 through an opening in faceplate 360. Connector 325 has a cable that is connected to BMC 350. Port 370 is configured to be internally accessible by a connector 335 which also has a cable 375 connected to BMC 350. Multiplexer 380 may include any system, device, or apparatus configured to selectively receive or transmit external data traffic via port 320 or internal data traffic via port 370. Multiplexer 380 may perform the selection based on a signal from BMC 350 and/or BMC 330. For example, multiplexer 380 may receive a signal or command to activate or de-activate port 320 and/or port 370, wherein if port 320 is active then port 370 is inactive and vice versa. In another embodiment, instead of a multiplexer, a BMC with multiple available MACs may be used instead.

A light-emitting diode (LED) may be used to indicate that port 320 is active or inactive. An external switch may be used to activate port 320. Similarly, another LED may be used to indicate that port 370 is active or inactive. An intra-BMC link, which is the link used to connect port 370 with BMC 350, such as cable 375, may be on a private point-to-point link. A high-bandwidth Ethernet MAC block to a PHY chip for BMC 350 may be configured which may have a dedicated or configuration-specific routing for the internal access mode. For example, when BMC 350 is in a shared NIC mode, a dedicated NIC may be freed up for internal rerouting to subsystem 310. In another example, an MII may be used to connect a MAC to a PHY chip or the port. Other variants of the MII, such as SGMII, gigabit media-independent interface (GMII), reduced gigabit media-independent interface (RGMII), etc. may be used.

Figure 4A:
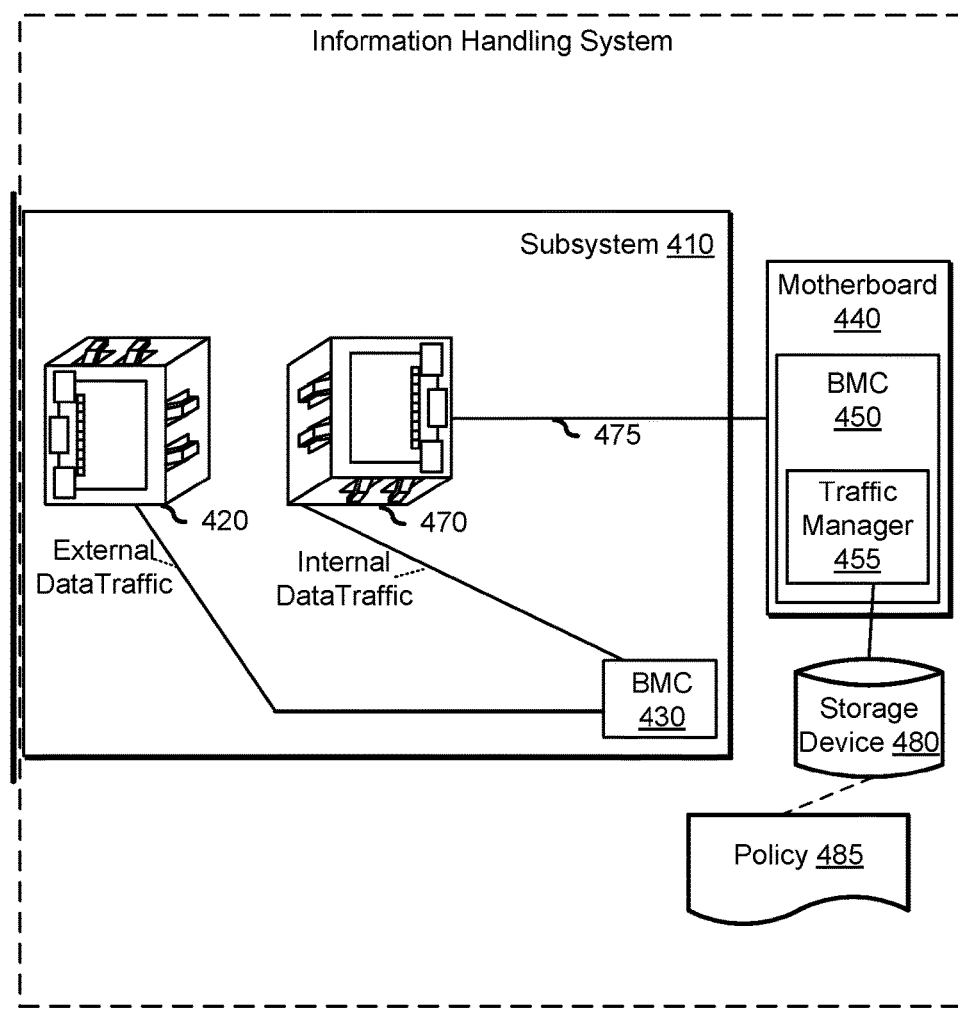
FIG. 4A and FIG. 4B are block diagrams illustrating a system for flexible, high-bandwidth link management between system and subsystem BMCs, according to an embodiment of the present disclosure.
Figure 4B:
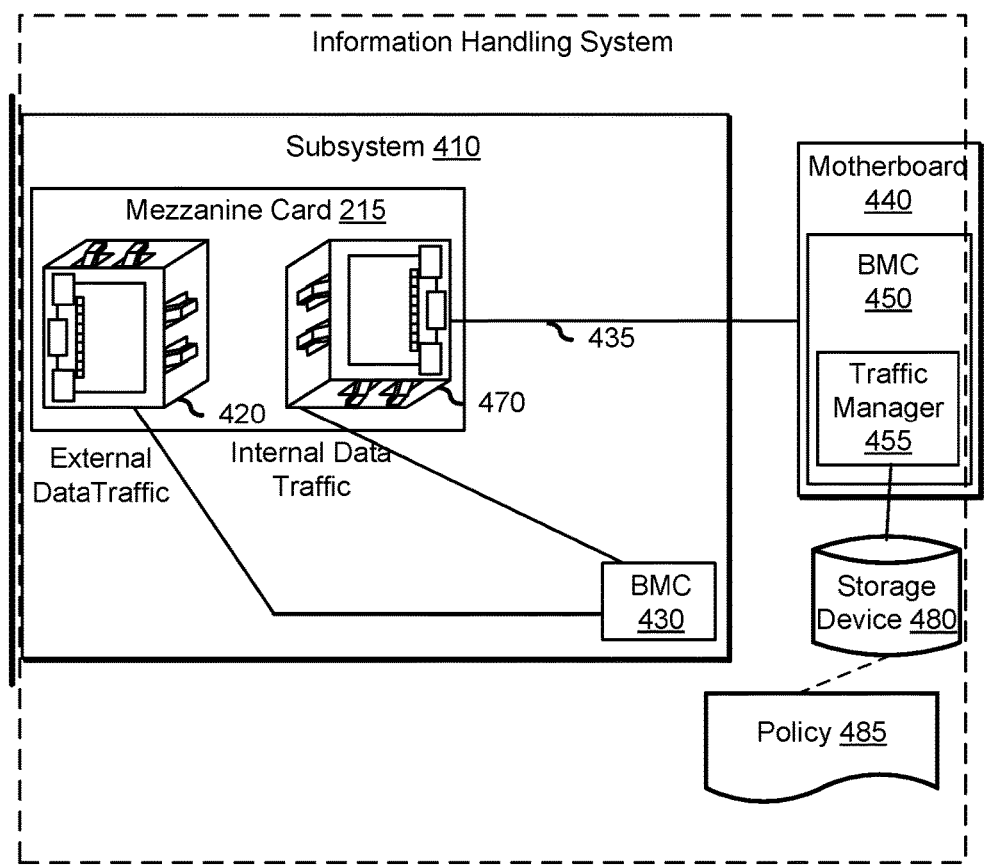

FIG. 4A and FIG. 4B show an information handling system 400 with flexible, high-bandwidth link management between system and subsystem BMCs. Information handling system 400 is similar to information handling system 300 of FIG. 3A and FIG. 3B. Information handling system 400 may be configured with two MACs and two physical interfaces or ports, wherein each interface or port has a static orientation, such that the high-bandwidth link between the BMCs is mutually exclusive or in separate networks. For example, the external interface may be used for telemetry and management of the subsystem or add-in card while the internal interface may be used for management of the information handling system. The primary BMC and the secondary BMC can coordinate functions and/or capabilities associated with each physical interface or port. The orientation of the physical interface or port may be determined during manufacture. Information handling system 400 includes a subsystem 410 and a motherboard 440 with a BMC 450. BMC 450 is associated with storage device 480 that stores a policy 485. Subsystem 410 includes a port 420, a port 470, and a BMC 430. FIG. 4B shows information handling system 400, wherein subsystem 410 also includes a mezzanine card 415 which includes port 420 and port 470 instead of being directly disposed on subsystem 410 as in FIG. 4A.

In this embodiment, BMC 450 may be configured to serve as a platform security and control plane hub that interacts with BMC 430. BMC 450 may be configured to provide access attempt detection and access control to BMC 430. For example, BMC 430 may alert BMC 450 when an attempt to tamper with port 420 and/or port 470 is detected. In another example, BMC 450 may configure which services and/or applications can be allowed to run on either the external or internal interface. BMC 450 may enforce routing behaviors based on policies and/or access controls such as policy 485. For example, BMC 450 may apply a set of rules based on the policies and/or access controls to determine which set of data to be transmitted via port 420 or port 470 or which services to run on port 420 versus port 470. Traffic manager 455, which may be an I²C card, can be configured to determine the services or the type of data that may be transmitted and/or received via the internal interface or the external interface from/to BMC 430. For example, telemetry data may be transmitted using the external interface while firmware updates may be transmitted using the internal interface. In another example, traffic manager 455 may only grant session requests to BMC 430 that are from BMC 450 with authenticated MAC address and credentials, such that no external session requests or requests from other components are allowed. For example, a hypertext transfer protocol (HTTP) may not be allowed but Redfish® may be allowed.

Figure 5:
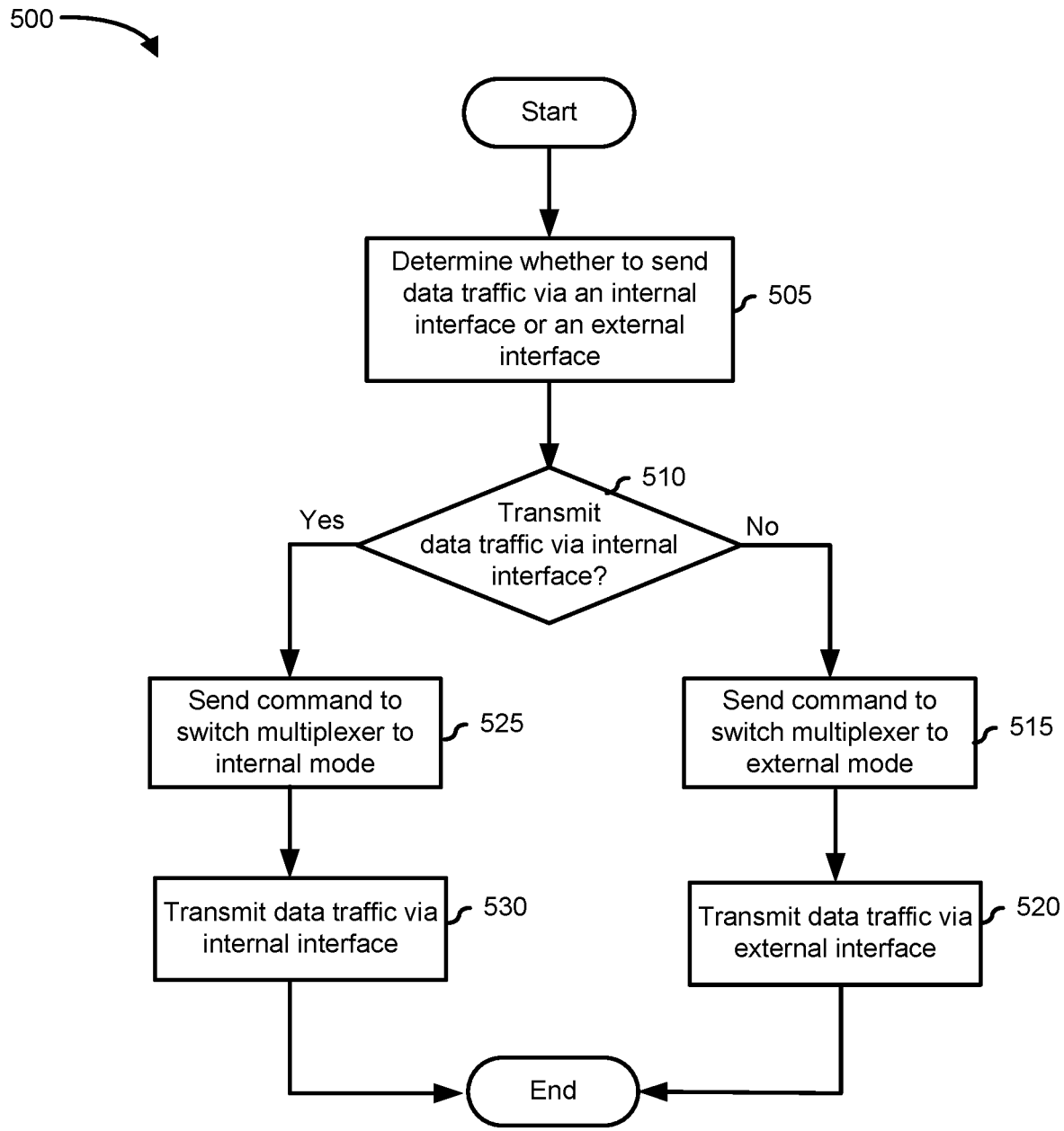
FIG. 5 is a flowchart illustrating a method for flexible, high-bandwidth link management between system and subsystem BMCs, according to an embodiment of the present disclosure.

FIG. 5 shows a flowchart of a method 500 for flexible, high-bandwidth link management between system and subsystem BMCs. Method 500 enables a configurable high-speed management path between a system and subsystem BMCs, Method 500 may be performed by BMC 350 of FIG. 3A and FIG. 3B. However, it should be recognized that other systems may be utilized to perform the described method. One of skill in the art will appreciate that this flowchart explains a typical example, which can be extended to advanced applications or services in practice.

Method 500 typically starts at block 505 where a primary BMC determines whether data traffic between the primary BMC and the secondary BMC should be transmitted via an internal interface or an external interface. The primary BMC may apply one or more policies or access controls to determine which interface to use. For example, a first set of data may be transmitted via the internal interface and a second set of data may be transmitted via the external interface. The primary BMC may determine whether the current data being processed is a subset of the first set of data or a subset of the second set of data. At decision block 510, if the data traffic is to be transmitted via the internal interface, then the "YES" branch is taken and the method proceeds to block 525. If the data traffic is not to be transmitted via the internal interface, then the "NO" branch is taken and the method proceeds to block 515.

At block 515, the primary BMC sends a command to a multiplexer to switch the multiplexer to the external interface, such as to activate the external interface and deactivate the internal interface. At block 520, the data traffic may be transmitted via the external interface. At block 525, the primary BMC sends a command to a multiplexer to switch the multiplexer to the internal interface, such as to activate the internal interface and deactivate the external interface. At block 530, the data traffic may be transmitted via the internal interface.

Figure 6:
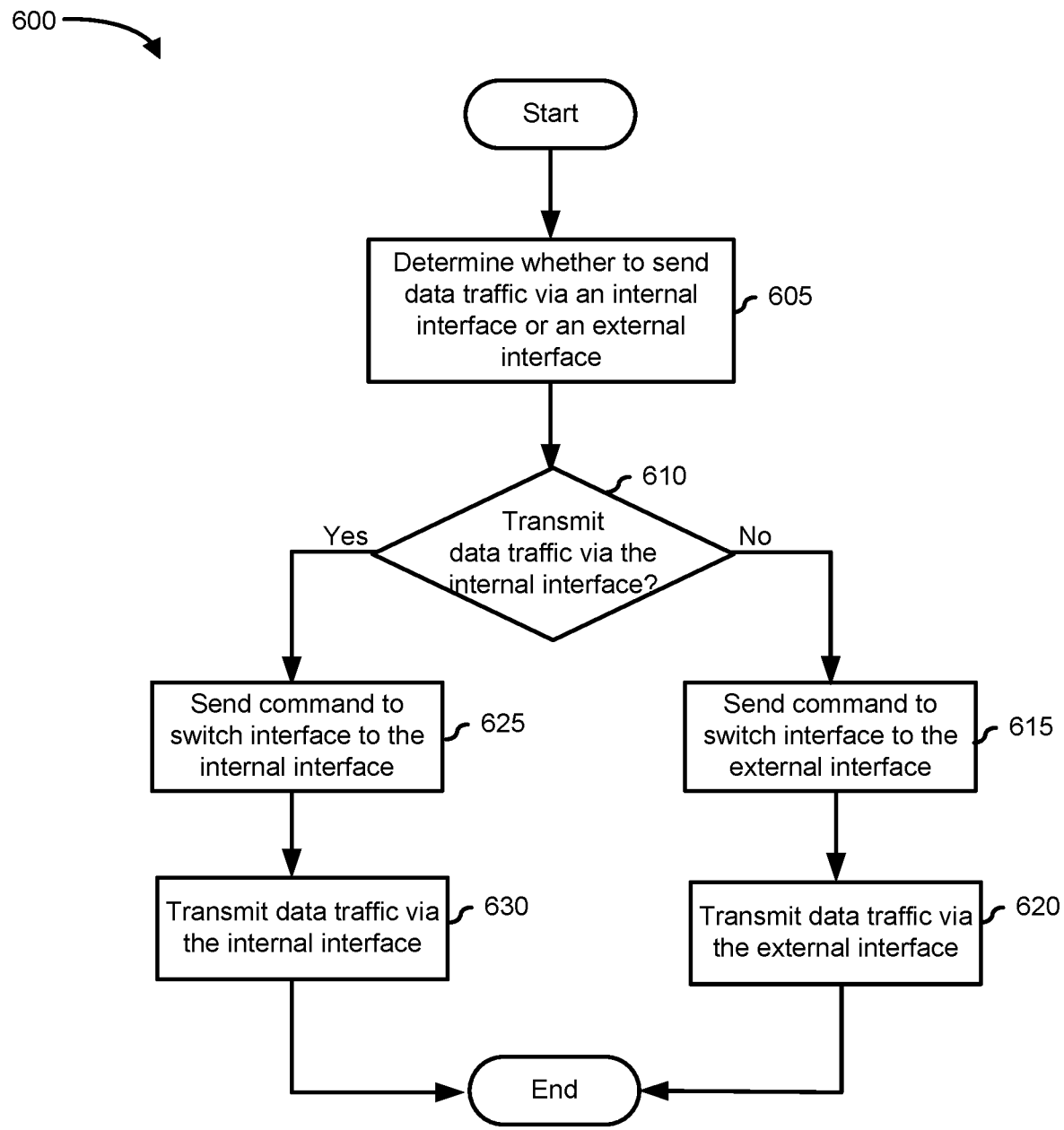
FIG. 6 is a flowchart illustrating a method for flexible, high-bandwidth link management between system and subsystem BMCs, according to an embodiment of the present disclosure.

FIG. 6 shows a flowchart of a method 600 for flexible, high-bandwidth link management between system and subsystem BMCs. Method 600 enables a configurable high-speed management path between a system and subsystem BMCs. Method 600 may be performed by BMC 450 of FIG. 4A and FIG. 4B. However, it should be recognized that other systems may be utilized to perform the described method. One of skill in the art will appreciate that this flowchart explains a typical example, which can be extended to advanced applications or services in practice.

Method 600 typically starts at block 605 where a primary BMC determines whether a secondary BMC should send data traffic via an internal interface or an external interface. The data traffic may be transmitted between the primary BMC and the secondary BMC. The primary BMC may apply one or more policies or access controls to determine where to send the data traffic. For example, a first set of data may be transmitted via the internal interface and a second set of data may be transmitted via the external interface. The primary BMC may determine whether the data being processed is a subset of the first set of data or a subset of the second set of data. At decision block 610, if the data traffic is to be transmitted via the internal interface, then the "YES" branch is taken and the method proceeds to block 625. If the data traffic is not to be transmitted via the internal interface, then the "NO" branch is taken and the method proceeds to block 615.

At block 615, the primary BMC sends a command to the secondary BMC to activate the external interface and deactivate the internal interface. At block 620, the data traffic may be transmitted via the external interface. At block 625, the primary BMC sends a command to the secondary BMC to activate the internal interface and deactivate the external interface. At block 630, the data traffic may be transmitted via the internal interface.

Although FIG. 5 and FIG. 6 show example blocks of method 500 and method 600 in some implementation, method 500 and method 600 may include additional blocks, fewer blocks, different blocks, or differently arranged blocks than those depicted in FIG. 5 and FIG. 6. Those skilled in the art will understand that the principles presented herein may be implemented in any suitably arranged processing system. Additionally, or alternatively, two or more of the blocks of method 500 and method 600 may be performed in parallel.

FIG. 7 illustrates an embodiment of an information handling system 700 including processors 702 and 704, a chipset 710, a memory 720, a graphics adapter 730 connected to a video display 734, a non-volatile RAM (NV-RAM) 740 that includes a basic input and output system/extensible firmware interface (BIOS/EFI) module 742, a disk controller 750, a hard disk drive (HDD) 754, an optical disk drive 756, a disk emulator 760 connected to a solid-state drive (SSD) 764, an input/output (I/O) interface 770 connected to an add-on resource 774 and a trusted platform module (TPM) 776, a network interface 780, and a BMC 790. Processor 702 is connected to chipset 710 via processor interface 706, and processor 704 is connected to the chipset via processor interface 708. In a particular embodiment, processors 702 and 704 are connected together via a high-capacity coherent fabric, such as a HyperTransport link, a QuickPath Interconnect, or the like. Chipset 710 represents an integrated circuit or group of integrated circuits that manage the data flow between processors 702 and 704 and the other elements of information handling system 700. In a particular embodiment, chipset 710 represents a pair of integrated circuits, such as a northbridge component and a southbridge component. In another embodiment, some or all of the functions and features of chipset 710 are integrated with one or more of processors 702 and 704.

Memory 720 is connected to chipset 710 via a memory interface 722. An example of memory interface 722 includes a Double Data Rate (DDR) memory channel and memory 720 represents one or more DDR Dual In-Line Memory Modules (DIMMs). In a particular embodiment, memory interface 722 represents two or more DDR channels. In another embodiment, one or more of processors 702 and 704 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 720 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 730 is connected to chipset 710 via a graphics interface 732 and provides a video display output 736 to a video display 734. An example of a graphics interface 732 includes a PCIe interface and graphics adapter 730 can include a four-lane (×4) PCIe adapter, an eight-lane (×8) PCIe adapter, a 16-lane (×16) PCIe adapter, or another configuration, as needed or desired. In a particular embodiment, graphics adapter 730 is provided down on a system PCB. Video display output 736 can include a Digital Video Interface (DVI), a High-Definition Multimedia Interface (HDMI), a DisplayPort interface, or the like, and video display 734 can include a monitor, a smart television, an embedded display such as a laptop computer display, or the like.

NV-RAM 740, disk controller 750, and I/O interface 770 are connected to chipset 710 via an I/O channel 712. An example of I/O channel 712 includes one or more point-to-point PCIe links between chipset 710 and each of NV-RAM 740, disk controller 750, and I/O interface 770. Chipset 710 can also include one or more other I/O interfaces, including a PCIe interface, an Industry Standard Architecture (ISA) interface, a Small Computer Serial Interface (SCSI) interface, an I²C interface, a System Packet Interface (SPI), a USB, another interface, or a combination thereof. NV-RAM 740 includes BIOS/EFI module 742 that stores machine-executable code (BIOS/EFI code) that operates to detect the resources of information handling system 700, to provide drivers for the resources, to initialize the resources, and to provide common access mechanisms for the resources. The functions and features of BIOS/EFI module 742 will be further described below.

Disk controller 750 includes a disk interface 752 that connects the disc controller to a hard disk drive (HDD) 754, to an optical disk drive (ODD) 756, and to disk emulator 760. An example of disk interface 752 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 760 permits SSD 764 to be connected to information handling system 700 via an external interface 762. An example of external interface 762 includes a USB interface, an institute of electrical and electronics engineers (IEEE) 1394 (Firewire) interface, a proprietary interface, or a combination thereof. Alternatively, SSD 764 can be disposed within information handling system 700.

I/O interface 770 includes a peripheral interface 772 that connects the I/O interface to add-on resource 774, to TPM 776, and to network interface 780. Peripheral interface 772 can be the same type of interface as I/O channel 712 or can be a different type of interface. As such, I/O interface 770 extends the capacity of I/O channel 712 when peripheral interface 772 and the I/O channel are of the same type, and the I/O interface translates information from a format suitable to the I/O channel to a format suitable to the peripheral interface 772 when they are of a different type. Add-on resource 774 can include a data storage system, an additional graphics interface, a NIC, a sound/video processing card, another add-on resource, or a combination thereof. Add-on resource 774 can be on a main circuit board, on a separate circuit board or add-in card disposed within information handling system 700, a device that is external to the information handling system, or a combination thereof.

Network interface 780 represents a network communication device disposed within information handling system 700, on a main circuit board of the information handling system, integrated onto another component such as chipset 710, in another suitable location, or a combination thereof. Network interface 780 includes a network channel 782 that provides an interface to devices that are external to information handling system 700. In a particular embodiment, network channel 782 is of a different type than peripheral interface 772, and network interface 780 translates information from a format suitable to the peripheral channel to a format suitable to external devices.

In a particular embodiment, network interface 780 includes a NIC or host bus adapter (HBA), and an example of network channel 782 includes an InfiniBand channel, a Fibre Channel, a Gigabit Ethernet (GigE) channel, a proprietary channel architecture, or a combination thereof. In another embodiment, network interface 780 includes a wireless communication interface, and network channel 782 includes a Wi-Fi channel, a near-field communication (NFC)

channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 782 can be connected to an external network resource (not illustrated). The network resource can include another information handling system, a data storage system, another network, a grid management system, another suitable resource, or a combination thereof.

BMC 790 is connected to multiple elements of information handling system 700 via one or more management interface 792 to provide out-of-band monitoring, maintenance, and control of the elements of the information handling system. As such, BMC 790 represents a processing device different from processor 702 and processor 704, which provides various management functions for information handling system 700. For example, BMC 790 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 790 can vary considerably based on the type of information handling system. BMC 790 can operate in accordance with an Intelligent Platform Management Interface (IPMI). Examples of BMC 790 include an Integrated Dell® Remote Access Controller (iDRAC).

Management interface 792 represents one or more out-of-band communication interfaces between BMC 790 and the elements of information handling system 700, and can include an I²C bus, a System Management Bus (SMBUS), a Power Management Bus (PMBUS), a Low Pin Count (LPC) interface, a serial bus such as a USB or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 700, that is apart from the execution of code by processors 702 and 704 and procedures that are implemented on the information handling system in response to the executed code.

BMC 790 operates to monitor and maintain system firmware, such as code stored in BIOS/EFI module 742, option ROMs for graphics adapter 730, disk controller 750, add-on resource 774, network interface 780, or other elements of information handling system 700, as needed or desired. In particular, BMC 790 includes a network interface 794 that can be connected to a remote management system to receive firmware updates, as needed or desired. Here, BMC 790 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 790 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 790, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 790 is included on a main circuit board (such as a baseboard, a motherboard, or any combination thereof) of information handling system 700 or is integrated onto another element of the information handling system such as chipset 710, or another suitable element, as needed or desired. As such, BMC 790 can be part of an integrated circuit or a chipset within information handling system 700. An example of BMC 790 includes an iDRAC or the like. BMC 790 may operate on a separate power plane from other resources in information handling system 700. Thus BMC 790 can communicate with the management system via network interface 794 while the resources of information handling system 700 are powered off. Here, information can be sent from the management system to BMC 790 and the information can be stored in a RAM or NV-RAM associated with the BMC. Information stored in the RAM may be lost after power-down of the power plane for BMC 790, while information stored in the NV-RAM may be saved through a power-down/power-up cycle of the power plane for the BMC.

Information handling system 700 can include additional components and additional busses, not shown for clarity. For example, information handling system 700 can include multiple processor cores, audio devices, and the like. While a particular arrangement of bus technologies and interconnections is illustrated for the purpose of example, one of skill will appreciate that the techniques disclosed herein are applicable to other system architectures. Information handling system 700 can include multiple central processing units (CPUs) and redundant bus controllers. One or more components can be integrated together. Information handling system 700 can include additional buses and bus protocols, for example, I²C and the like. Additional components of information handling system 700 can include one or more storage devices that can store machine-executable code, one or more communications ports for communicating with external devices, and various input and output (I/O) devices, such as a keyboard, a mouse, and a video display.

For purposes of this disclosure, information handling system 700 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 700 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 700 can include processing resources for executing machine-executable code, such as processor 702, a programmable logic array (PLA), an embedded device such as a System-on-a-Chip (SoC), or other control logic hardware. Information handling system 100 can also include one or more computer-readable media for storing machine-executable code, such as software or data.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. An information handling system comprising:
a primary baseboard management controller communicatively coupled to a secondary baseboard management controller, the secondary baseboard management controller configured to transmit a first set of data and a second set of data;
a rotatable interface that is communicatively coupled to the secondary baseboard management controller, and wherein the rotatable interface includes an external access mode and an internal access mode, wherein the first set of data may be transmitted via the external access mode and the second set of data may be transmitted via the internal access mode.

2. The information handling system of claim 1, wherein the rotatable interface is physically accessible through a faceplate.

3. The information handling system of claim 1, wherein the secondary baseboard management controller is included in an accelerator.

4. The information handling system of claim 1, wherein the second set of data includes firmware updates.

5. The information handling system of claim 1, wherein the first set of data includes telemetry data.

6. The information handling system of claim 1, wherein a faceplate of the rotatable interface is blocked when the rotatable interface is configured for external access mode.

7. The information handling system of claim 1, wherein the rotatable interface is accessible inside a chassis of the information handling system when the rotatable interface is configured for internal access mode.

8. The information handling system of claim 1, the rotatable interface includes a tamper detection.

9. The information handling system of claim 1, wherein the secondary baseboard management controller is further configured to only grant session requests that are from the primary baseboard management controller.

10. The information handling system of claim 1, wherein the rotatable interface configured to be physically rotatable when outside of a chassis of the information handling system.

11. The information handling system of claim 1, wherein the secondary baseboard management controller is associated with two media access control addresses.

12. An information handling system, comprising:
a secondary baseboard management controller configured to transmit a first set of data via a rotatable interface that is externally accessible from the information handling system when the rotatable interface is in an external access mode and to transmit a second set of data via the rotatable interface when the rotatable interface is in an internal access mode;
a primary baseboard management controller communicatively coupled to the second baseboard management controller; and
the rotatable interface being communicatively coupled to the secondary baseboard management controller, wherein the rotatable interface includes the external access mode and the internal access mode.

13. The information handling system of claim 12, wherein the secondary baseboard management controller is included in an add-in card.

14. The information handling system of claim 12, wherein the secondary baseboard management controller is included in an accelerator.

15. The information handling system of claim 12, wherein when the rotatable interface is configured for the external access mode, a first port of the rotatable interface is accessible through a faceplate that is flushed with an external chassis of the information handling system.

16. The information handling system of claim 15, wherein when the rotatable interface is configured for the internal access mode, the first port of the rotatable interface is accessible from inside the information handling system.

17. The information handling system of claim 12, wherein the rotatable interface configured to be physically rotatable when outside of a chassis of the information handling system.

18. A method comprising:
- determining, by a primary baseboard management controller, whether to transmit current data via a rotatable interface associated with a secondary baseboard management controller that is communicatively coupled to the rotatable interface, wherein the rotatable interface includes an external access mode and an internal access mode;
- if the current data is of a first set of data, then transmitting the current data via the external access mode; and
- if the current data is of a second set of data, then transmitting the current data to be transmitted via the internal access mode.

19. The method of claim 18, wherein the rotatable interface is physically accessible through a faceplate that is flushed with an external chassis of an information handling system.

20. The method of claim 18, wherein the rotatable interface configured to be physically rotatable when outside of a chassis of an information handling system.

* * * * *